United States Patent Office 3,444,277
Patented May 13, 1969

3,444,277
METHOD FOR MOLDING FOAMED INORGANIC ARTICLES
William J. McMillan, Midland, Mich., assignor to The Dow Chemical Company, Midland, Mich., a corporation of Delaware
No Drawing. Filed Jan. 20, 1967, Ser. No. 610,479
Int. Cl. B29d 27/00
U.S. Cl. 264—43                            1 Claim

ABSTRACT OF THE DISCLOSURE

A method for molding foamed inorganic articles whereby voids may be eliminated comprising heating in a closed mold a mixture of discrete previously fully foamed inorganic siliceous granules which are at about their lowest density, and foamable inorganic particles whose foaming temperature is in the range of the sintering temperature of said previously fully foamed granules.

---

This specification and claim constitute an original application for Letters Patent.

It is known in the art that granular materials when sintered to form an integral mass, shrink for various reasons. For example, foamed clay which as been previously foamed to its lowest density and is incapable of further foaming, shrinks when bonded together by sintering. Accordingly, the ability to mold such particulate material into a casting or mass of low density, which will conform closely to the shape and dimensional tolerances of the mold cavity, would be of great advantage.

A primary object of the present invention is to provide a novel and improved method of molding and sintering previously foamed siliceous particulate materials, which have been foamed to about their lowest density, to provide a molded low density mass closely conforming in shape and size to the mold cavity.

Another object of the invention is to provide a method of eliminating dimensional voids in sintering and molding discrete foamed inorganic granules.

Other objects and advantages of the present invention will become more apparent from the following description of the invention.

In general the present invention is a novel process comprising the combination of steps of: providing a mixture of discrete previously fully foamed inorganic siliceous granules which preferably are at about their lowest density and foamable non-foamed or partially prefoamed inorganic particles whose foaming temperature is in the range of the sintering temperature of said fully foamed granules, and heating said mixture in a closed mold, the minimum amount of the foamable particles to be used being that required to at least compensate for the shrinkage of the fully foamed granules during sintering and molding. The maximum amount of the foamable particles to be used is in effect only limited by the desired density of the final molded, sintered, foamed article. The mixture develops and maintains pressure on the internal mold cavity surface while heated to a temperature above the softening temperature of said fully foamed granules in the mixture, thereby closely maintaining the shape and dimensions of the mold cavity by the molded foamed article.

The invention also contemplates the use of nonfoamable fillers as additives both within the mixture to be processed and at the interface thereof with the mold walls to change or modify the internal as well as the surface characteristics with respect, e.g., to color, bonding characteristic, porosity, density, or structure strength of the molded, sintered, product mass.

In general, the operable temperature range for use in the invention is the sintering temperature range of the fully foamed component employed. This will vary with each material as is understood by one skilled in the art. In any event, a sintering temperature which is below the melting temperature or decomposition temperature of the fully foamed component must be employed. Normally, a sintering temperature range of the order of from about 600° C. to about 1700° C. will be employed.

The time period employed in the present molding method is a period wherein satisfactory sintering of the foamed component is obtained concurrently with foaming of the fully foamed component, and depends in general on the components employed, their proportions, and any additives employed.

The previously fully foamed component of the mixture to be processed is generally siliceous in nature and ordinarily (but not necessarily) the major constituent by volume in said mixture. This foamed component includes, e.g., foamed glass, foamed furnace slag, foamed naturally occurring minerals such as pumice and foamed clay. In general, the foamed component intended for use in the invention primarily includes previously fully foamed materials at their lowest density which shrink upon sintering as opposed to continuing to foam upon being heated by enlargement of their already existing cell structure.

A particularly fully foamed material suited for use in the present invention is a foamed clay product made by the Selas Corporation of America and disclosed in U.S. Letters Patent 3,046,607. This material has a sintering temperature range of from about 1475 to about 1525° C. At about 1550° C., the foamed clay melts, while below 1475° C. an inordinate and uneconomical time period is required to obtain a satisfactorily sintered bond between the granules thereof.

The foamable component of the granule mixture, (which as set forth hereinbefore is meant to include partially foamed materials) generally siliceous in nature, usually being the minor component, includes in general foamable glass particles, foamable particles of glass forming materials, foamable naturally occurring minerals such as obsidian, and perlite, and foamable combinations of glass and blowing agents.

A particularly suitable solid unfoamed foamable glass particle for use in the present invention is one made by the process of (1) heating a comminuted inorganic glass-forming material having a silicon dioxide content of at least about 50 weight percent under an applied gas pressure of at least about 100 pounds per square inch to a temperature sufficient to fuse said material into a vitreous mass having unexpanded compressed gas containing cellules, and (2) maintaining said vitreous mass under an applied gas pressure of at least about 100 p.s.i. until said mass has cooled to a solidified essentially gas impermeable material, whereupon it is granulated to discrete foamable particles.

Another suitable foamable compact particle which may be employed in the invention, providing the foaming temperature of said particle is within the sintering temperature range of the major component, is one made by the method of first preparing a particulated glass mixture comprising (1) a pulverized glass whose softening point is between about 700° C. and about 1100° C., (2) one or more gassing agents capable of producing gases over the foaming temperature range where the molten glass mixture has a viscosity of, e.g., from about $10^{5.6}$ to about $10^{8.1}$ poises, and (3) a water-soluble binder material which preferably becomes a component of the glass during the molding and foaming operation, provided in a particle size which preferably does not exceed 50 mesh U.S. Standard Sieve. This glass mixture is admixed with a liquid such as water, compacted, e.g., in an inclined pan granulator, and dried into foamable compacts of pellets or balls having a size preferably of from about ⅛ to 1 inch in cross-section, said pellets having an apparent density of at least 50 percent of the absolute density of the glass mixture being employed. Example II illustrates such compacts further.

The foamable constituent must, in general, foam at a temperature below the melting point of the prefoamed constituent, and within the sintering temperature thereof, the most desirable temperature being the optimum sintering conditions of the foamed component. That is, at a temperature where satisfactory bonding in a minimum of time with the least shrinkage occurs. The upper limit of temperature on the foamable constituent is where the foam will in effect collapse and not substantially maintain the desired pressure.

The novel method of the present invention comprises a unique molding process for obtaining a sintered mass of foamed material which closely conforms to the shape and dimensional size of the mold cavity in which the material is molded. The invention is simple, economical, and highly versatile since it not only carries out its purpose but enables various characteristics of the molded mass to be varied at will by simple additions of additives and manipulations of process conditions. Among the products which may be produced by the method of the present invention as homogeneous, integrated articles without voids due to shinkage are insulating bricks, construction blocks, construction boards, filter media, decorative tile, drain tiles, heat shields, inserts for fire doors and certain wall panels, and the like.

The following examples are illustrative of the present invention but are not to be construed as a limitation thereon:

EXAMPLE I 50 grams of "Selas" type foamed clay particles were thoroughly mixed with 5 grams of foamable silica particles, made by the method set forth in column 2 of the specification hereinbefore, having a mesh size of about −12+16, U.S. Standard Sieve, and placed in a graphite crucible having mold cavity dimension of 2.3 inches in diameter. A top closure comprising a solid graphite cylinder whose outside dimension was slightly less than the crucible inside dimension was inserted into the crucible resting on top of the mixture contents, thereby providing an enclosed mold cavity having an inside height of about 0.7 of an inch. The mold and contents were heated to 1500° C. for 15 minutes, to accomplish sintering and foaming of the silica granules, whereupon, the sintered mass was cooled and removed from the mold. The product was a well bonded sintered mass of foamed clay and glass whose dimensions were 2.3 inches in diameter and 0.7 inch in height, i.e. substantially the same as the mold cavity dimensions.

When a comparable charge of foamed "Selas" clay granules alone was similarly sintered in the same mold, the product was sintered but its diameter was only 1.8 inches, while the mold cavity diameter as aforesaid was 2.3 inches. The difference in size resulted from shrinkage during sintering.

EXAMPLE II

Foamable glass compact balls were prepared by the method described in columns 2 and 3 of this specification. These had a weight composition as follows:

|  | Parts |
| --- | --- |
| Ferro Corp. glass frit No. 3124 | 100 |
| Calcium carbonate | 10 |
| Sodium metasilicate | 1 |

A number of these balls were foamed individually to a density of about 6 to 8 pounds per cubic foot by heating for 15 minutes in a furnace at about 810° C. in an open metal tray. A metal mold having cavity dimensions of 2 x 3 x 3 inches was loaded with 12 grams of these prefoamed balls plus 30 grams (an excess amount over that required to compensate for shrinkage during sintering of the foamed balls on molding) of unfoamed balls of the same composition as above. The closed mold was heated for 25 minutes in a furnace at about 810° C.

The mold was opened and the foamed molding removed. The molded article had a density of about 8.6 lbs./ft.$^3$ and exhibited a continuous, attractive appearing external surface and a uniform cell size in the core, and conformed essentially to the cavity size of the mold showing that any shrinkage of the prefoamed balls during molding was compensated for by the foamable balls during molding.

The present invention may be changed or modified without departing from the spirit or scope thereof.

I claim:
1. A method for obtaining a sintered molding of foamed inorganic granules conforming substantially in shape and size to a mold cavity which comprises: providing in a closed mold a mixture of discrete previously foamed inorganic siliceous granules and foamable siliceous inorganic particles, said foamable inorganic particles having a foaming temperature in the sintering temperature range of said previously foamed inorganic granules and the minimum amount of said foamable inorganic particles being sufficient to compensate for any shrinkage in volume during sintering of said previously foamed granules, heating said mixture to the sintering temperature range of said previously foamed granules, and cooling the resulting sintered foamed mass.

References Cited

UNITED STATES PATENTS

| 3,215,542 | 11/1965 | Tinker | 106—40 |
| 3,264,380 | 8/1966 | Parsons | 264—43 |
| 3,321,414 | 5/1967 | Vieli | 264—42 |
| 3,331,694 | 7/1967 | Heidrich et al. | 264—43 |
| 3,341,339 | 9/1967 | Stein | 106—40 |

DONALD J. ARNOLD, *Primary Examiner.*

U.S. Cl. X.R.

106—40, 122; 264—42